(12) United States Patent
Kocemba

(10) Patent No.: US 11,641,359 B2
(45) Date of Patent: May 2, 2023

(54) SYSTEM FOR CONNECTING COMPUTING DEVICES

(71) Applicant: Opera Norway AS, Oslo (NO)

(72) Inventor: Maciej Kocemba, Wroclaw (PL)

(73) Assignee: Opera Norway AS, Oslo (NO)

( * ) Notice: Subject to any disclaimer, the term of this patent is extended or adjusted under 35 U.S.C. 154(b) by 166 days.

(21) Appl. No.: 16/389,559

(22) Filed: Apr. 19, 2019

(65) Prior Publication Data

US 2019/0327243 A1    Oct. 24, 2019

Related U.S. Application Data

(60) Provisional application No. 62/660,403, filed on Apr. 20, 2018.

(51) Int. Cl.
    *H04L 9/40* (2022.01)
(52) U.S. Cl.
    CPC ........ *H04L 63/104* (2013.01); *H04L 63/0876* (2013.01)
(58) Field of Classification Search
    CPC .............. H04L 63/104; H04L 63/0876; H04L 63/0428
    See application file for complete search history.

(56) References Cited

U.S. PATENT DOCUMENTS

| 10,104,515 B1 * | 10/2018 | Graves | H04L 67/563 |
| 11,063,762 B1 * | 7/2021 | Makarskyy | G06F 9/547 |
| 2009/0285118 A1 * | 11/2009 | Yoshikawa | H04L 67/2804 370/254 |
| 2013/0110936 A1 * | 5/2013 | Miura | H04L 63/0876 709/204 |
| 2014/0181513 A1 * | 6/2014 | Marek | H04L 63/062 713/168 |
| 2014/0282901 A1 * | 9/2014 | Dwan | H04L 67/22 726/4 |
| 2014/0289805 A1 * | 9/2014 | Li | H04L 63/104 726/4 |
| 2015/0304369 A1 * | 10/2015 | Sandholm | H04W 4/21 715/753 |
| 2015/0358792 A1 * | 12/2015 | Hashimoto | H04W 8/26 370/329 |
| 2016/0044122 A1 * | 2/2016 | Sandholm | H04W 4/06 709/206 |
| 2016/0180063 A1 * | 6/2016 | Bhandaru | G06F 21/105 726/26 |
| 2016/0315934 A1 * | 10/2016 | Kirner | H04L 63/20 |
| 2018/0246889 A1 * | 8/2018 | Bernard | H04L 9/3226 |

(Continued)

*Primary Examiner* — Taghi T Arani
*Assistant Examiner* — Blake I Narramore
(74) *Attorney, Agent, or Firm* — DLA Piper LLP (US)

(57) ABSTRACT

A method of connecting computing devices for content sharing comprising: a first device generating a unique verification identifier and storing it in memory, requesting a pairing identifier from a privilege-group server, receiving the pairing identifier from the privilege-group server and storing it in memory, generating a code based on the unique verification identifier and the pairing identifier, a second device receiving the code, determining the unique verification identifier and the pairing identifier based on the code, storing the unique verification identifier and the pairing identifier in memory, and sending the pairing identifier to the privilege-group server.

20 Claims, 8 Drawing Sheets

(56) References Cited

U.S. PATENT DOCUMENTS

| | | | |
|---|---|---|---|
| 2018/0293392 A1* | 10/2018 | Tsai | H04L 63/0823 |
| 2019/0188002 A1* | 6/2019 | Otsuka | G06F 3/1203 |
| 2019/0297036 A1* | 9/2019 | Kuo | H04L 51/38 |
| 2020/0036772 A1* | 1/2020 | Xie | H04L 67/1097 |
| 2020/0159563 A1* | 5/2020 | Luo | G06F 9/455 |

\* cited by examiner

SYSTEM FOR CONNECTING COMPUTING DEVICES

This application claims benefit of U.S. Provisional Application No. 62/660,403, filed Apr. 20, 2018, which is incorporated by reference in its entirety.

BRIEF DESCRIPTION OF THE DRAWINGS

The accompanying drawings, which are incorporated in and constitute a part of this specification, illustrate an implementation of the invention and, together with the description, explain the goals, advantages and principles of the invention. Corresponding reference numerals indicate corresponding parts throughout the several views of the drawings. In the drawings.

DETAILED DESCRIPTION

Computer users may desire to connect several devices together in a group in order to share data. The devices may all be owned and operated by one user when in the group, or the devices may be owned and operated by different users. Connection in such a group may require secure connection for the sharing of data and mechanisms to prevent unwelcome devices from joining the group. Some systems for connecting multiple devices require crating accounts for all of the devices and logging in from each device, or attaching content to other independent mechanisms for sending messages and the like (e.g., email). These are tiresome procedures, which require a lot of manual and error prone steps. Devices may be joined by use of a privilege-group server which grants privileges to participate in a group and validates privileges of participating devices. The use of a privilege-group server for connecting devices may allow for a more efficient and rapid connection of multiple devices into a group and may allow all of the privilege-group devices to have the same view of the shared data, as though they are, together, one computing device with a single display.

Figure 1:
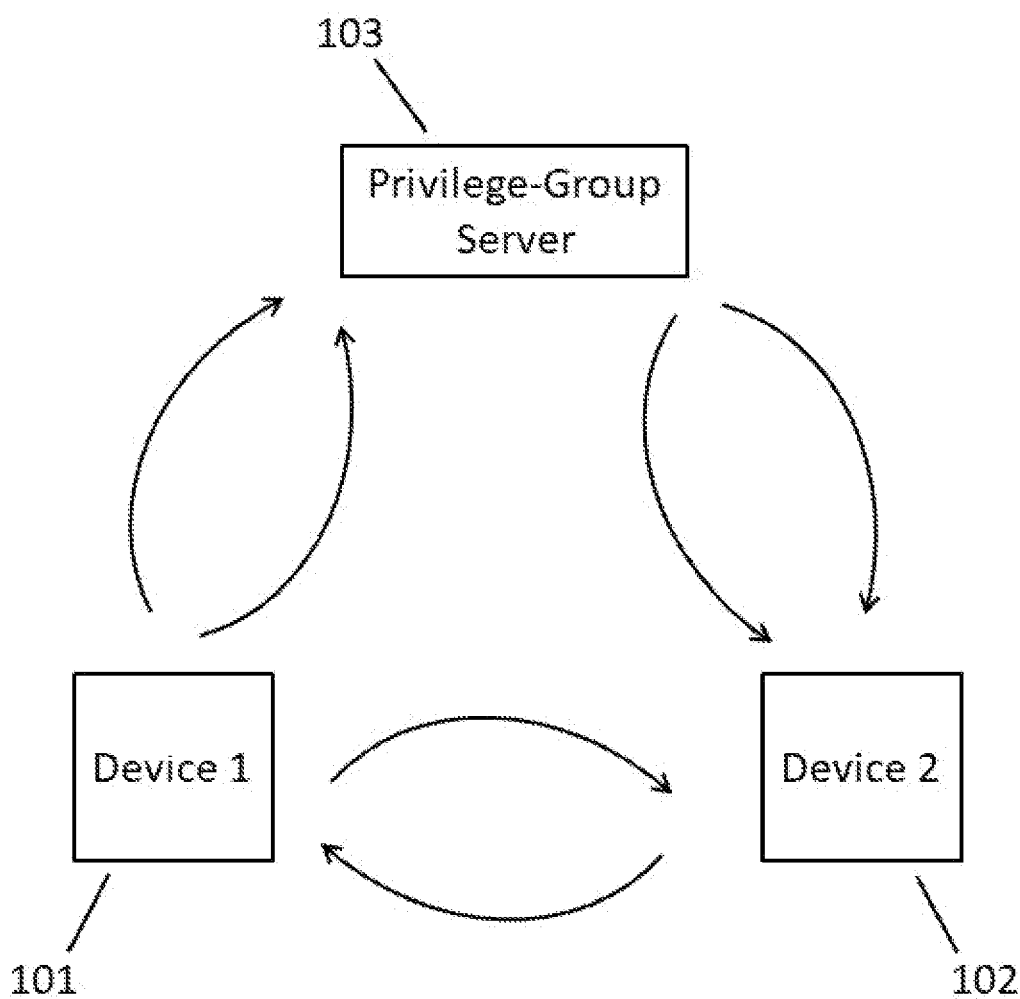
FIG. 1 is diagram of an exemplary embodiment of a system for connecting computing devices for content sharing.

A system for connecting computing devices for content sharing, constructed according to the principles of the present disclosure, is indicated generally as 100 in FIG. 1. The system may be configured to allow multiple computing devices to be securely connected in a group with restricted privileges to control access to the group and data transmitted between member of the group.

Figure 2:
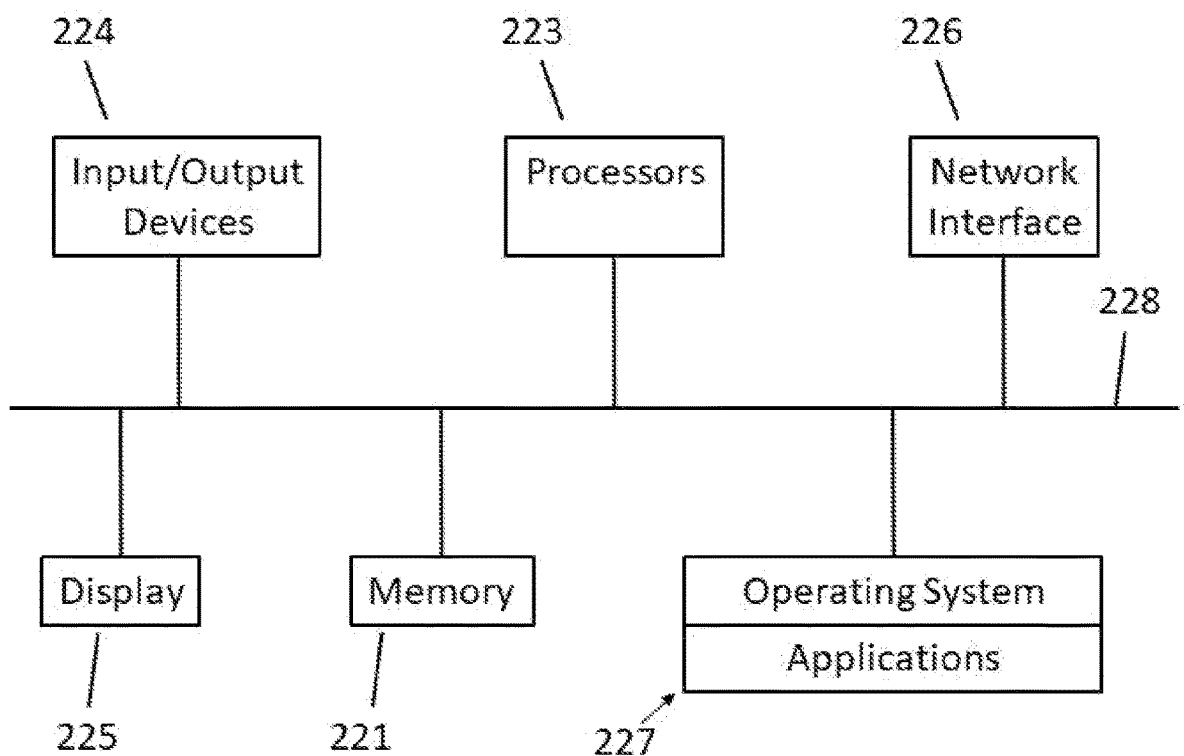
FIG. 2 is a diagram of an exemplary embodiment of a computing device.

The system 100 generally comprises a first computing device 101, a second computing device 102, and a privilege-group server 103. The first and second computing devices 101 and 102 are generally described below with reference to FIG. 2. It will be understood that this general description applies to all devices belonging to a privilege group in any number. FIG. 2 shows a computing device 201 according to an embodiment of the disclosure. For example, computing device 201 may perform the functions related to connecting computing devices for content sharing.

The computing device 201 may be any electronic device that runs software applications derived from compiled instructions, including, without limitation, personal computers, servers, smart phones, media players, electronic tablets, game consoles, email devices, etc. In some implementations, the computing device 201 may include one or more processors 223, one or more input/output devices 224, one or more display devices 225 one or more network interfaces 226, and one or more computer-readable mediums 227. Each of these components may be coupled by a bus 228.

Display device 225 may be any known display technology, including but not limited to display devices using Liquid Crystal Display (LCD) or Light Emitting Diode (LED) technology. Processor 223 may be any known processor technology, including but not limited to graphics processors and multi-core processors. Input/output device 224 may be any known input/output device technology, including but not limited to a keyboard (including a virtual keyboard), mouse, track ball, scanner, keyboard, magnetic reader, camera, IR emitter/receiver, and touch-sensitive pad or display. Bus 228 may be any known internal or external bus technology, including but not limited to ISA, EISA, PCI, PCI Express, NuBus, USB, Serial ATA or FireWire. Computer-readable medium 227 may be any medium that participates in providing instructions to processor 223 for execution, including without limitation, non-volatile storage media (e.g., optical disks, magnetic disks, flash drives, etc.), or volatile media (e.g., SDRAM, ROM, etc.).

Computer-readable medium 227 may include various instructions for implementing an operating system 229 (e.g., Mac OS®, Windows®, Linux). The operating system 229 may be multi-user, multiprocessing, multitasking, multi-threading, real-time, and the like. The operating system 229 may perform basic tasks, including but not limited to: recognizing input from input/output device 224; sending output to display device 225; keeping track of files and directories on computer-readable medium 227; controlling peripheral devices (e.g., disk drives, printers, etc.) which can be controlled directly or through an I/O controller; and managing traffic on bus 228. Network interface 226 may establish and maintain network connections (e.g., software for implementing communication protocols, such as TCP/IP, HTTP, Ethernet, telephony, etc.).

Computing device 221 may also include, or be operatively coupled to communicate with, one or more memories 221. Memory 221 may be a mass storage devices for storing data files; such devices include magnetic disks, such as internal hard disks and removable disks; magneto-optical disks; and optical disks. Memory 221 may be suitable for tangibly embodying computer program instructions and data. Memory 221 may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device 225 such as an LED or LCD monitor for displaying information to the user and an Input/Output device 224 such as a keyboard; a pointing device, such as a mouse or a trackball, by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet. One or more features or steps of the disclosed embodiments may be implemented using an API. An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

Figure 3:
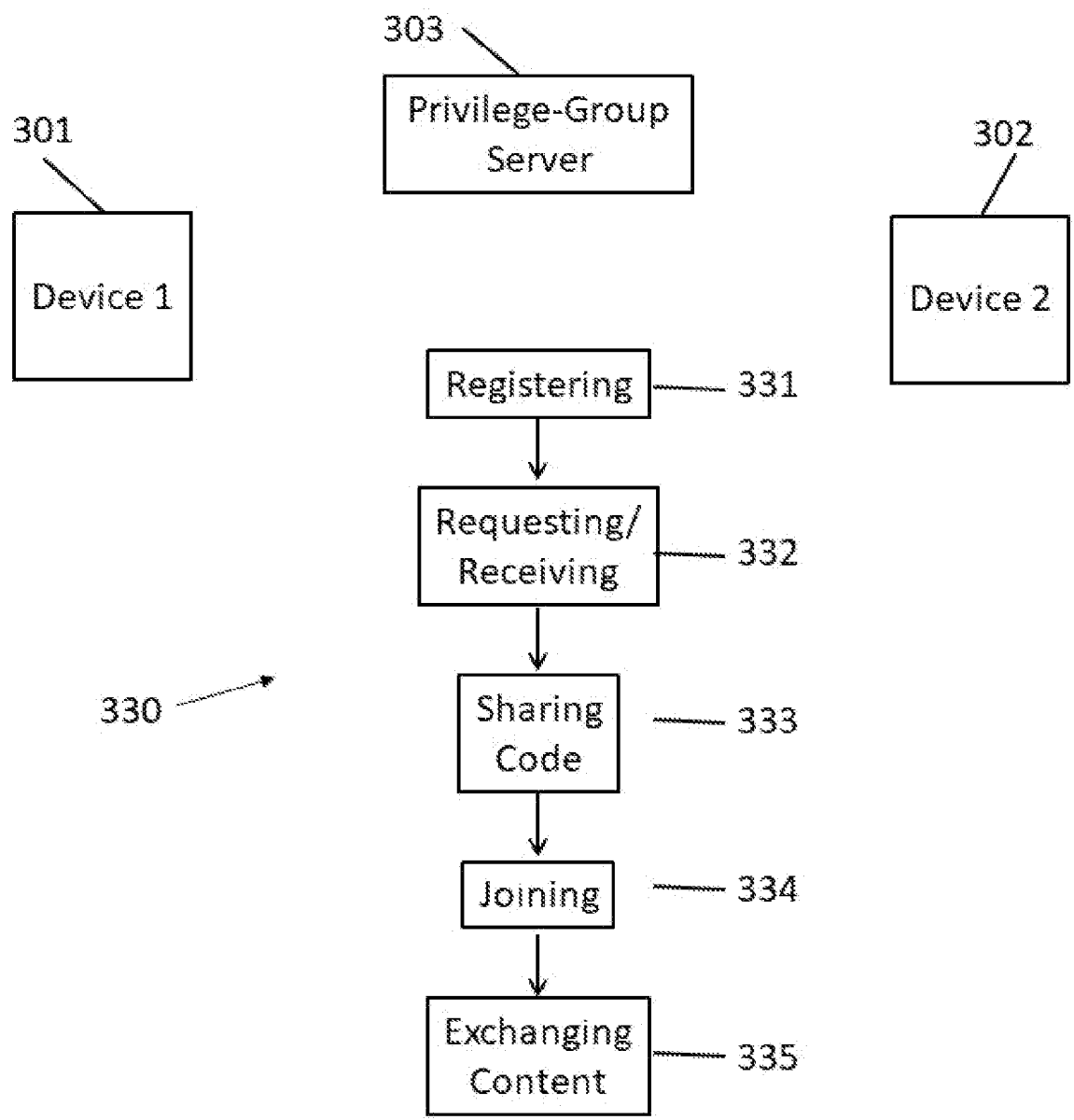
FIG. 3 is a diagram of an exemplary embodiment of a method for connecting computing devices for content sharing.
Figure 7:
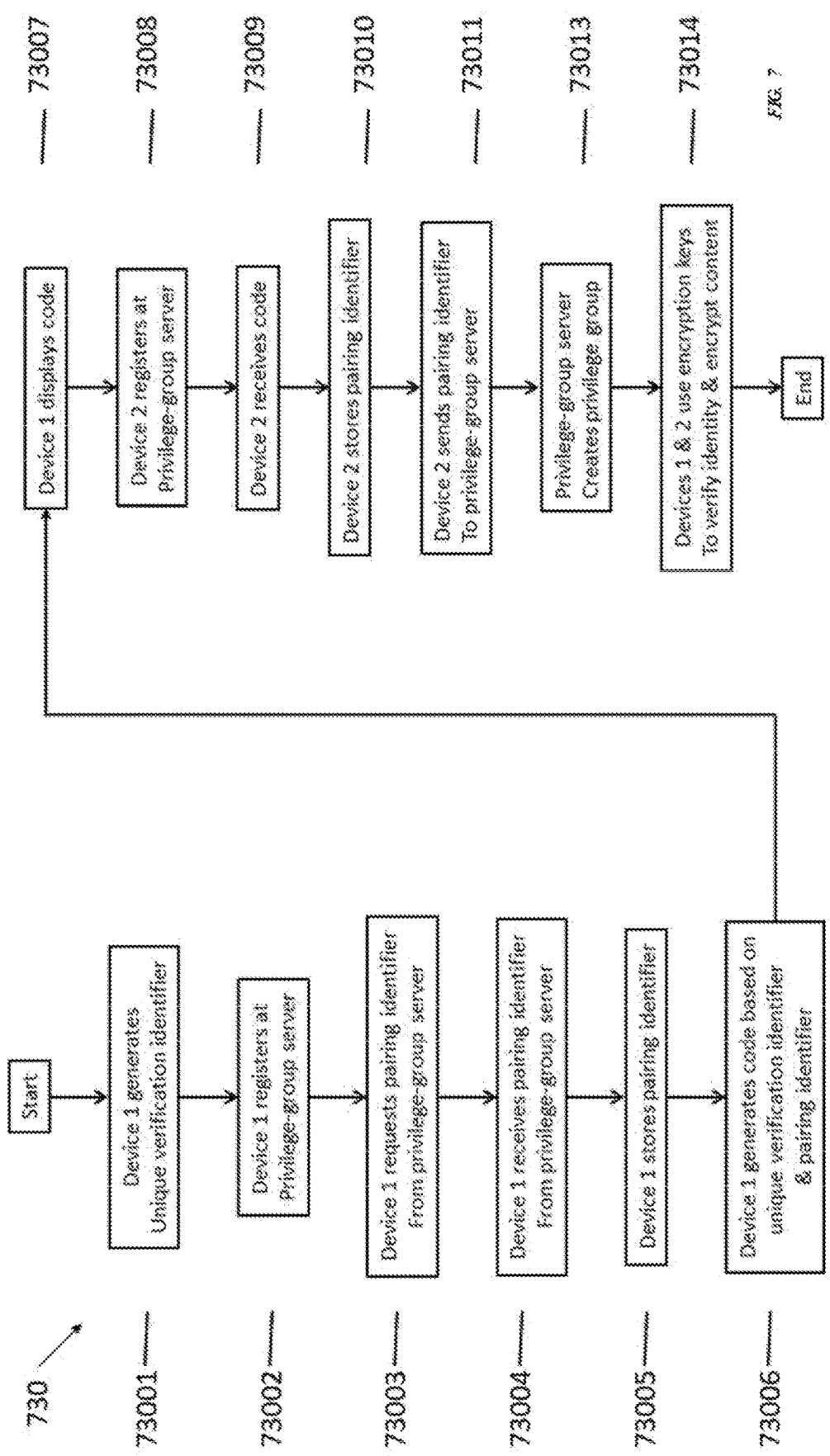
FIG. 7 is a diagram of an exemplary embodiment of a method for connecting computing devices for content sharing.

FIG. 3 shows an exemplary process 330 for connecting computing devices into a privilege group for content sharing. In the exemplary embodiment depicted in FIG. 3, the privilege-group is formed with two devices; however, it will be understood that a privilege-group may be formed with more than two devices. FIG. 7 shows another exemplary process 730 for connecting computing devices into a privilege group for content sharing. In some exemplary embodiments, Process 330, 730 may allow self-sending and receiving messages between web browser clients on different devices owned by the same user by connecting the devices in a common privilege group. In some exemplary embodiments, Process 330, 730 may not require actions such as creating user accounts or providing user email addresses. Process 330 may include activating an application on a first device and a second device (e.g., Opera Touch, Excel, Apple Pages, Google Chrome). The application may be configured to execute any or all of the steps of Process 330, 730.

Figure 6:
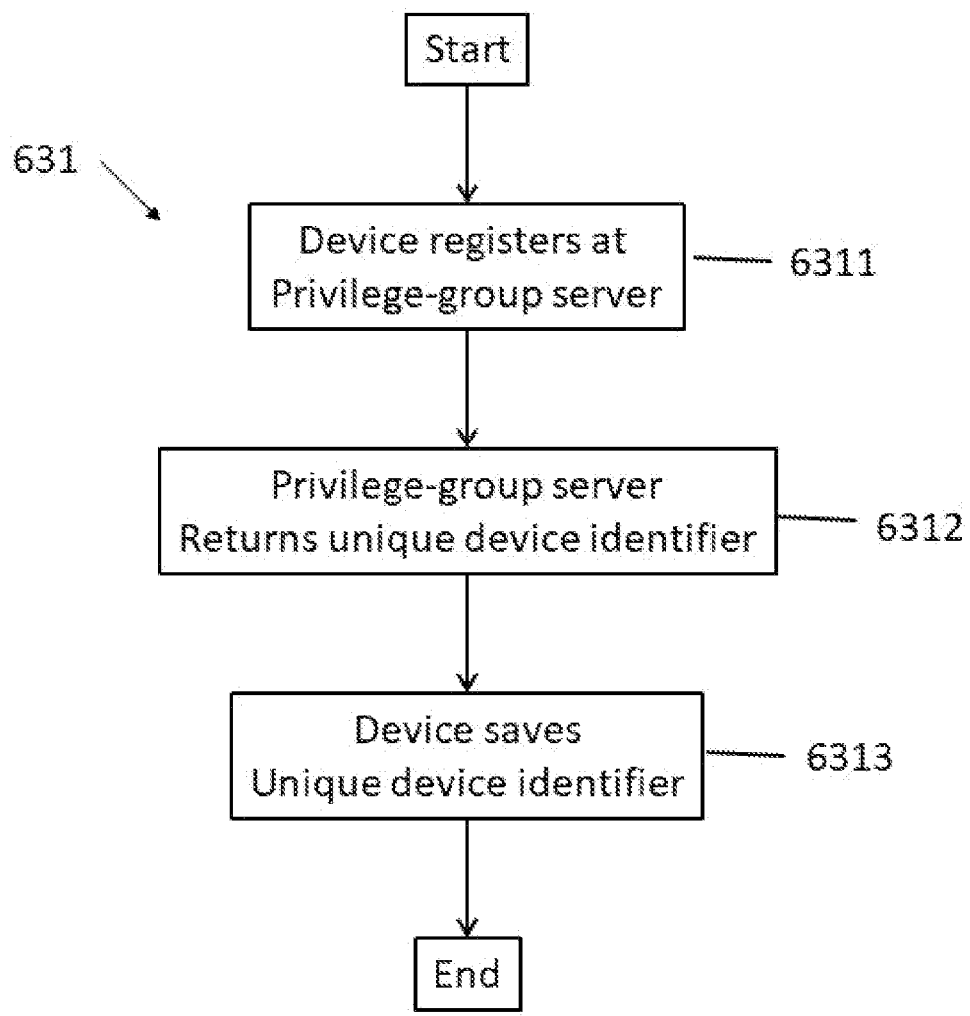
FIG. 6 is a diagram of an exemplary embodiment of a method of device registration.

Process 330, 730 may include a first device 301 and a second device 302 registering 331, 73002, 73008 with or logging in to a privilege-group server 303. FIG. 6 depicts an exemplary embodiment of a process 631 of registering a device with or logging in to a privilege-group server 303. The first device 301 and the second device 302 may each request and receive 332 a unique device identifier from the privilege-group server in order to identify the respective device to the privilege-group server and to all other devices in the privilege group. In some exemplary embodiments, when a device registers or logs in at a privilege-group server 6311, the privilege-group server returns 6312 a unique device identifier to the device. The unique device identifier may be a numeric identifier, an alphabetic identifier, an alphanumeric identifier, a pictographic identifier, an radio frequency identifier, a microwave identifier, or any type of identifier that can be stored and transmitted in an electronic form. The first device 301 and the second device 302 may each store 6313 the unique device identifier in its own memory. Registering with or logging in to a privilege-group server 303 may be executed by the processor of the first device 301 or the second device 302 automatically without any affirmative action on the part of the user. Registering with or logging in to a privilege-group server 303 may be accomplished by use of an API. The privilege-group server 303 may validate the computing device to ensure correct usage of the API.

Process 330, 730 may include a first device 301, generating 73001 a unique verification identifier and storing the unique verification identifier in a memory of the first device. The unique verification identifier may be a numeric identifier, an alphabetic identifier, an alphanumeric identifier, a pictographic identifier, an radio frequency identifier, a microwave identifier, or any type of identifier that can be stored and transmitted in an electronic form. The first device 301 may take steps to prevent disclosure of the unique verification identifier to the privilege-group server. The first device 301 may request 73003 and receive 73004 a pairing identifier from a privilege-group server 303. The pairing identifier may be a numeric identifier, an alphabetic identifier, an alphanumeric identifier, a pictographic identifier, an radio frequency identifier, a microwave identifier, or any type of identifier that can be stored and transmitted in an electronic form. Requesting and receiving a pairing identifier may include a public key as used in asymmetric cryptography along with unique device identifier and additional metadata that may allow creation of the pairing identifier. The privilege-group server may grant the first device 301 privileges to join the group (i.e., the privilege-group server may add the first device 301 to the group identified by the pairing identifier). The first device 301 may store 73005 the pairing identifier in the memory of the first device.

The first device may generate a code 73006 based on the unique verification identifier and the pairing identifier. The code may comprise the unique verification identifier appended to the pairing identifier in sequence. The code may comprise the unique verification identifier and the pairing identifier joined in a non-linear spatial relationship. The code may comprise the unique verification identifier and the pairing identifier joined with other elements of any type also in the code. The code may comprise the unique verification identifier and the pairing identifier joined in a randomly selected relationship. The code may comprise the unique verification identifier and the pairing identifier joined in any other relationship as determined by the processor the first device 301. The first device 301 may make the code available 333, 73007 to other devices. Process 330 may include a second device 302 receiving the code from the first device 301. Making the code available by the first device 301 and receiving the code by the second device 302 may include transmitting the code electronically. Making the code available by the first device 301 and receiving the code by the second device 302 may include transmitting the code using infra-red transmission. Making the code available by the first device 301 and receiving the code by the second device 302 may include the first device presenting the code on a display and the user entering the code into the second device using an input/output device 324, such as a keyboard, mouse or a touch screen. Making the code available by the first device 301 may include showing the code on a display in the form of a scannable image and receiving 73009 the code by the second device 302 may include scanning the image using an input/output device 324, such as a scanner or a camera.

The second device 302 may determine the unique verification identifier and the pairing identifier from the code. The second device 302 may store 73010 the unique verification identifier and the pairing identifier in a memory of the second device. The second device 302 may send 73011 the pairing identifier to the privilege-group server 303. The privilege-group server may verify that the pairing identifier transmitted by the second device 302 matches the pairing identifier provided to the first device 301. The privilege-group server may grant the second device 302 privileges to join 334, 73013 the group (i.e., the privilege-group server may add the second device 302 to the group identified by the pairing identifier, thus creating the group). To ensure security, protect against unauthorized members in a privilege group, shield malicious attacks and hijacking of a privilege-group or elements of a computing device, each computing device in a privilege group or attempting to join a privilege may separately perform checks 73014 to verify the pairing identifier and the unique verification identifier it receives in a code. To exchange content, each computing device may encrypt the content with a key common to the privilege group.

Additional computing devices may join the privilege group by executing the same steps as device 2. The code for connecting new members of the privilege group may be made available by any computing device already joined in the privilege group. Process 330 may include formation of multiple privilege groups with the same privilege-group server. Different privilege groups on the same privilege-group server may be invisible to each other (i.e., the devices in Privilege Group A will not have access to or be visible to devices or content elements associated with Privilege Group B. Process 330 may prohibit individual devices from joining multiple privilege groups in order to ensure integrity and security of the content elements associated with each group. Process 330 may allow individual computing devices to join multiple privilege groups. Process 330 may include steps to ensure integrity and security of the content elements of each privilege group to which an individual device is joined. Process 330 may include a device in the privilege group receiving a confirmation of its own membership in the privilege group or membership of other devices in the privilege group. Confirmation may include display of information about the privilege group and members on a display of a member computing device.

Figure 8:
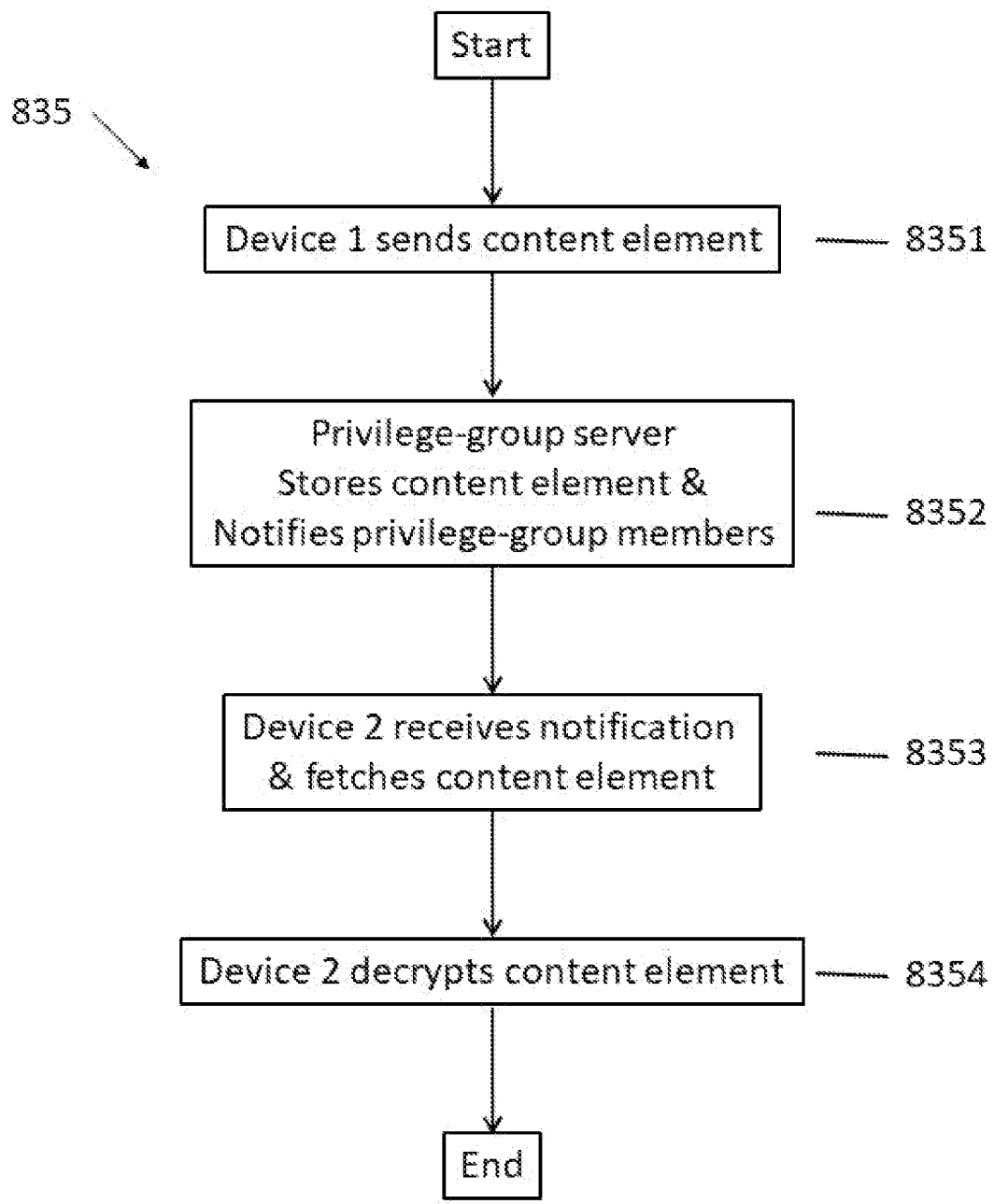
FIG. 8 is a diagram of an exemplary embodiment of a method of sharing content elements within a privilege group.

Process 330 may include the first device 301 and the second device 302 exchanging a content element 335 encrypted using the unique verification identifier between the processor of the first device and the processor of the second device through the privilege-group server. FIG. 8 depicts an exemplary embodiment of a method 835 of exchanging content elements between devices in a privilege group. The content element may be a text sequence, a message, a data file, a media file, a link, a note, a video file, an image file, a document file or any other type of content. The content element may include an interactive element (e.g., an icon or a code) which allows a user to activate content (e.g., play a video or sound track, access a website). Exchanging the content element may include transmitting the unique device identifier of the first device or the second device in or with the content element, to allow the other device to recognize the sending device. Process 835 may include a first device sending 8351 a content element to the privilege-group server. The privilege-group server may store 8352 the content element and notify other member of the privilege group of the new content element. Process 835 may include a second device in the privilege group receiving notification 8353 and fetching the content element. Process 835 may include encryption and decryption of content elements at any point of the exchange 8354.

The Process 330 may include the first device 301 or the second device 302 displaying a user interface containing the content element. Displaying the content element may include an indication of the device which originated the content element. Indication of the device may include an image of the device, a name of the device or any other way of identifying the device to the viewer of the display. Process 330 may include the first device 301 and the second device 302 exchanging a second content element encrypted using the unique verification identifier between the processor of the first device and the processor of the second device through the privilege-group server and the first device 301 or the second device 302 displaying a user interface containing both of the content elements in a temporal order. In some exemplary embodiments, the content elements may appear on the user interface as an ordered stream of messages or in the form of a timeline. The user interface may be a web browser, a function within a software application or a dedicated software application. The user interface may be invoked by an icon. The user interface may enable a fast and easy user experience, as content elements accessible inside an application (e.g., links to websites, parts of websites, links to videos or music files.) may be directly shared with a privilege-group, without the need to save such content elements on a local storage or switch to another application that can provide standard synchronization methods.

Figure 4:
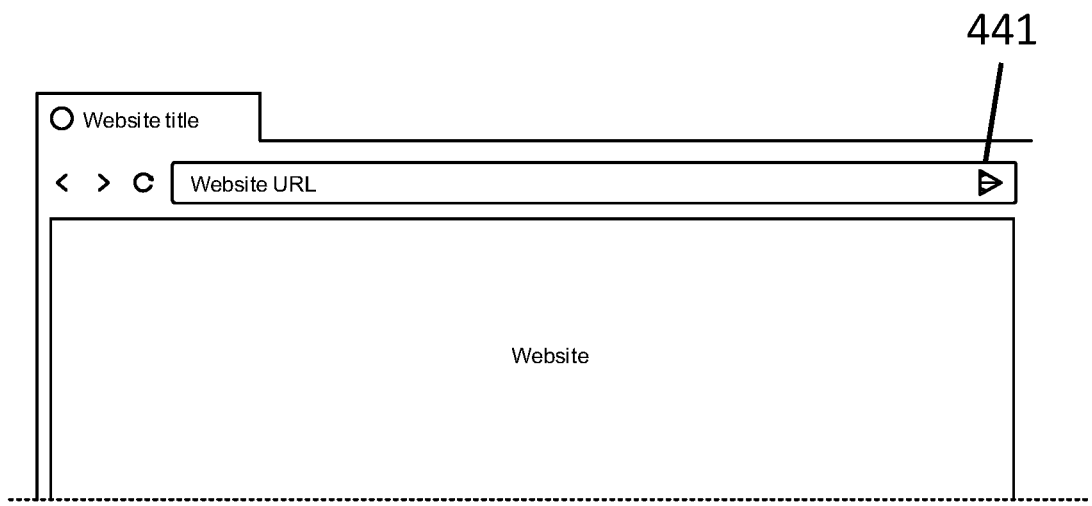
FIG. 4 is a diagram of an exemplary embodiment of a user interface.

FIG. 4 shows an example of a user interface. The icon depicted as 441 in FIG. 4 may be an example of an icon may would appear on a user interface and may be used to send content elements to the privilege-group.

Figure 5:
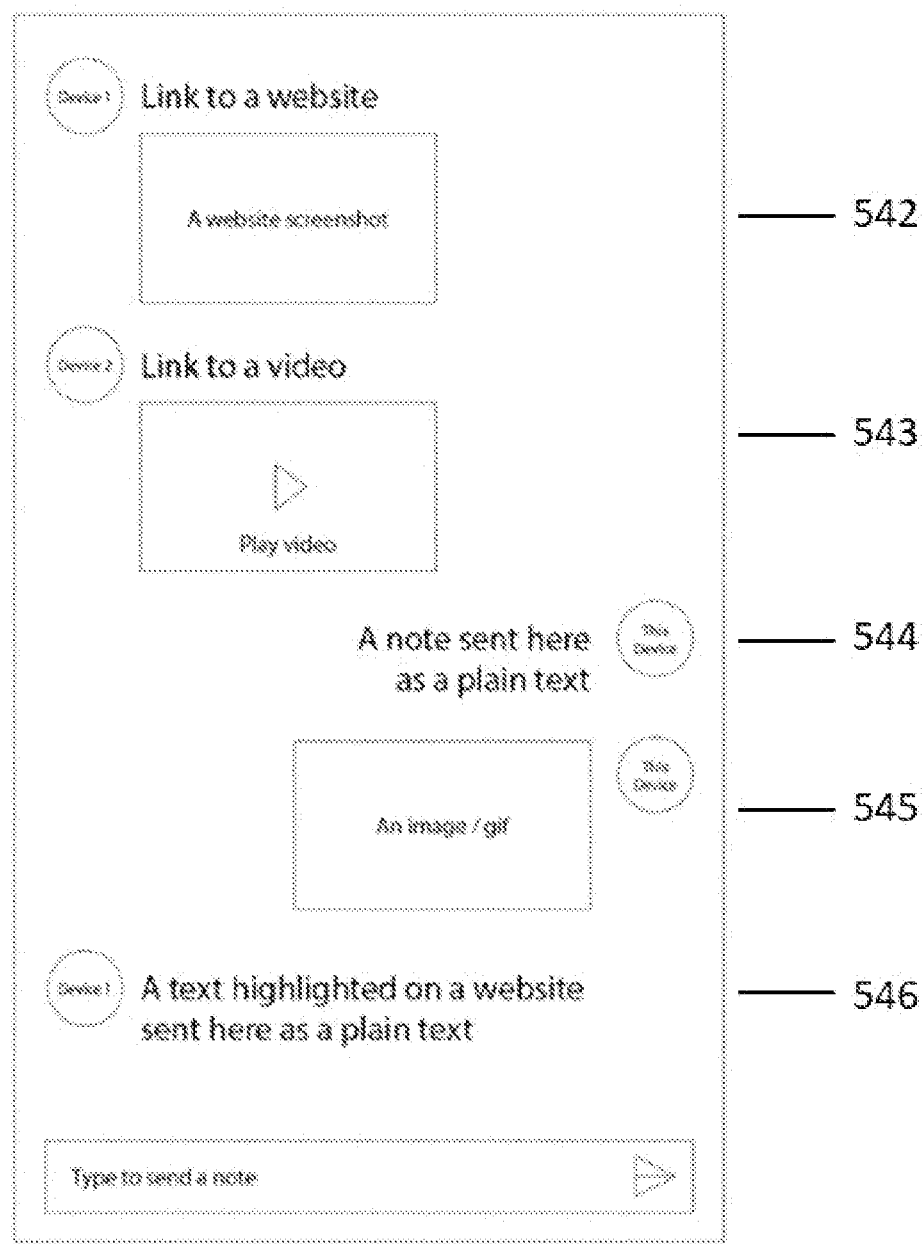
FIG. 5 is a diagram of an exemplary embodiment of a temporal sequence of content elements shared by a privilege group.

FIG. 5 provides an example of a temporally ordered sequence of content elements shared within a privilege group. For each content element shared with the privilege group, information about the sharing device, such as a timestamp or a content-element type, may be accessible. In FIG. 5, several types of content elements are provided as examples. The first content element 542 may have been shared by the device identified in the privilege group as "Device 1" and may be a link to a website. The user interface may also display a thumbnail of a content element, such as a website. The second content 543 element in FIG. 5 may provide an example of sharing a video file in a privilege group. This example may have been shared by the device identified in the privilege group as "Device 2," and the content element may contain an interactive element such that users may interact with the content element, playing the video in the stream or displaying the video in a separate browser tab. FIG. 5 also depicts two content elements 544 & 545 may have been shared by "this device" which may mean they were sent to the privilege group from the device the user is currently using. Content element 544 may be a textual element such as a message. Content element 545 may be an image file. In FIG. 5, the last content element 546 shared by "Device 1" may be part of the website that was highlighted and shared with the privilege group as plain text (which may illustrate a convenient way of sharing quotes or other sentences found online by simply highlighting these and sending to the privilege group using an icon). FIG. 5 does not illustrate all possibilities of types of such content elements and it is only an illustration to demonstrate an idea of presenting the privilege-group stream inside a user interface.

Process 330 may include managing existing privilege groups via a user interface of one or more of the connected computing devices. Managing group members or content elements may include various actions that may be performed by computing devices in the privilege group. Managing privilege groups may include removing particular devices from the privilege group. When a computing device is removed from a privilege group, all identification data may be discarded, and to ensure the security and integrity of the privilege group, any future access to the previous group by the discarded device may require the computing device to execute the full pairing protocol as though it had never been a member of the computing group. Managing privilege groups may include erasing a message from the privilege group stream.

Any of the steps of Process 330 may include implementation of encryption or other security techniques as are generally known in the art. Details of generating cryptographic keys, hashes of the data and validation of these methods are not described here as it is assumed these will be known to persons skilled in the art. It will be appreciated that no particular encryption methods are assumed in the examples and different embodiments of encrypting and validating information may be applied to achieve security of the content elements and the computing devices in a privilege group.

While various embodiments have been described above, it should be understood that they have been presented by way of example and not limitation. It will be apparent to persons skilled in the relevant art that various changes in form and detail can be made therein without departing from the spirit and scope. In fact, after reading the above description, it will be apparent to one skilled in the relevant art how to implement alternative embodiments. For example, other steps may be provided, or steps may be eliminated, from the described methods, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

What is claimed is:

1. A method of connecting computing devices for content sharing comprising:
generating, by a processor of a first device, a unique verification identifier;
storing, by the processor of the first device, the unique verification identifier in a memory of the first device;
requesting, by the processor of the first device, a pairing identifier from a privilege-group server using a unique device identifier of the first device and metadata, the pairing identifier is generated based on the unique device identifier of the first device and the metadata, the privilege-group server adding the first device to a group identified by the pairing identifier;
receiving, by the processor of the first device, the pairing identifier from the privilege-group server;
storing, by the processor of the first device, the pairing identifier in the memory of the first device;
generating, by the processor of the first device, a code based on the generated unique verification identifier and the received pairing identifier;
receiving, at a processor of a second device, the code;
determining, by the processor of the second device, the unique verification identifier and the pairing identifier based on the code;
storing the unique verification identifier and the pairing identifier in a memory of the second device; and
sending, by the processor of the second device, the pairing identifier to the privilege-group server.

2. The method of claim 1, further comprising:
registering, by the processor of the first device, with the privilege-group server, wherein registering comprises receiving the unique device identifier for the first device from the privilege-group server and storing the unique device identifier for the first device in the memory of the first device; and
registering, by the processor of the second device, with the privilege-group server, wherein registering comprises receiving a unique device identifier for the second device from the privilege-group server and storing the unique device identifier for the second device in the memory of the second device.

3. The method of claim 2, wherein registering by the processor of the first device or the second device is performed automatically without user input.

4. The method of claim 2, wherein the first device or the second device are added by the privilege-group server to a privilege group identified by the pairing identifier.

5. The method of claim 4, further comprising receiving, by the processor of the first device or the second device, confirmation of formation of a privilege group, connection to a privilege group, or failure to connect to a privilege group.

6. The method of claim 1, wherein the code is displayed by the first device in a scannable form, and wherein receiving the code comprises scanning the code in the scannable form with a scanning device of the second device.

7. The method of claim 1, further comprising exchanging a content element encrypted using the unique verification identifier between the processor of the first device and the processor of the second device through the privilege-group server.

8. The method of claim 7, wherein exchanging comprises including the unique device identifier of the first device or the second device in the content element.

9. The method of claim 7, further comprising displaying, by the first device or the second device, a user interface containing the content element.

10. The method of claim 7, wherein the content element includes an indication of the device which originated the content element.

11. The method of claim 7, wherein the content element includes an interactive element.

12. The method of claim 7, further comprising:
exchanging a second content element between the processor of the first device and the processor of the second device through the privilege-group server; and
displaying, by the first device, a user interface containing the first content element and the second content element in a temporal order.

13. A system for connecting computing devices for content sharing comprising:
a first device having a memory and a processor coupled to the memory, wherein the processor is configured to:
generate a unique verification identifier;
store the unique verification identifier in the memory;
request a pairing identifier from a privilege-group server using a unique device identifier of the first device and metadata, the pairing identifier is generated based on the unique device identifier of the first device and the metadata, the privilege-group server adding the first device to a group identified by the pairing identifier;
receive the pairing identifier from the privilege-group server;
store the pairing identifier in the memory;
generate a code based on the generated unique verification identifier and the received pairing identifier; and
a second device having a memory and a processor coupled to the memory, wherein the processor of the second device is configured to:
receive the code generated by the processor of the first device;
determine the unique verification identifier and the pairing identifier from the code;
store the unique verification identifier and the pairing identifier in the memory of the second device; and
send the pairing identifier to the privilege-group server.

14. The system of claim 13, wherein the processor of the first device is configured to:
register with the privilege-group server, wherein registering comprises receiving the unique device identifier for the first device from the privilege-group server and storing the unique device identifier for the first device in the memory of the first device,
wherein the processor of the second device is configured to:
register with the privilege-group server, wherein registering comprises receiving a unique device identifier for the second device from the privilege-group server and storing the unique device identifier for the second device in the memory of the second device.

15. The system of claim 14, wherein the processor of the first device or the second device is configured to register automatically without user input.

16. The system of claim 13, wherein the processor of the first device is configured to display the code in a scannable form, wherein the second device comprises a scanning device, and
wherein the processor of the second device is configured to receive the code by scanning the code with the scanning device.

17. The system of claim 13, wherein the processors of the first and second devices are configured to exchange a content element encrypted using the unique verification identifier through the privilege-group server.

18. The system of claim 17, wherein exchanging comprises including the unique device identifier of the first device or the second device in the content element.

19. The system of claim 17, wherein the first device is configured to display a user interface containing the content element.

20. A method of connecting computing devices for content sharing comprising:
generating, by a processor of a first device, a unique verification identifier;
storing, by the processor of the first device, the unique verification identifier in a memory of the first device;
registering, by the processor of the first device, with a privilege-group server, wherein registering comprises receiving a unique device identifier for the first device from the privilege-group server and storing the unique device identifier for the first device in the memory of the first device;
requesting, by the processor of the first device, a pairing identifier from a privilege-group server;
receiving, by the processor of the first device, the pairing identifier from the privilege-group server using the unique device identifier of the first device and metadata, the pairing identifier is generated based on the unique device identifier of the first device and the metadata, the privilege-group server adding the first device to a group identified by the pairing identifier;
storing, by the processor of the first device, the pairing identifier in the memory of the first device;
generating, by the processor of the first device, a code based on the generated unique verification identifier and the received pairing identifier;
receiving, at a processor of a second device, the code;
determining, by the processor of the second device, the unique verification identifier and the pairing identifier based on the code;
storing the unique verification identifier and the pairing identifier in a memory of the second device;
registering, by the processor of the second device, with the privilege-group server, wherein registering comprises receiving a unique device identifier for the second device from the privilege-group server and storing the unique device identifier for the second device in the memory of the second device;
sending, by the processor of the second device, the pairing identifier to the privilege-group server; and
exchanging a content element encrypted using the unique verification identifier between the processor of the first device and the processor of the second device through the privilege-group server.

\* \* \* \* \*